3,518,213
AQUEOUS RESINOUS COATING COMPOSITIONS FOR ELECTROPHORETIC DEPOSITION
Mituji Miyoshi and Kazuo Matsuura, Kawasaki-shi, and Yutaka Otsuki, Tokyo, Japan, assignors to Nippon Oil Company, Limited, Tokyo, Japan
No Drawing. Filed July 22, 1968, Ser. No. 746,273
Claims priority, application Japan, Aug. 5, 1967, 42/49,992; Mar. 29, 1968, 43/20,096
Int. Cl. C09d *3/66; 5/02;* C23b *13/00*
U.S. Cl. 260—22                                              14 Claims

ABSTRACT OF THE DISCLOSURE

A novel resinous coating composition for electrophoretic deposition in the form of an aqueous solution or emulsion mainly consisting of a product obtained by neutralizing an adduct of a polybutadiene having a molecular weight of 500–2,000 and containing 50–90% 1,2-linkage, 10–50% 1,4-linkage and an unsaturated dicarboxylic anhydride with a basic compound, and a process for producing said composition.

BACKGROUND OF THE INVENTION

Field of the invention

This invention relates to a resinous coating composition for electrophoretic deposition and a process for producing the same.

Description of the prior art

Heretofore, a maleic oil or alkyd resin has been primarily used as a resin for electrophoretic deposition and the use of epoxy resins and acrylic resins has also been proposed.

For example, there have been known various resins for consituting a coating film in the electrophoretic deposition technique, such as oil varnish mainly consisting of natural drying oil as proposed in British Pat. Nos. 455,810 and 496,945; a product obtained by reacting fatty acid of linseed oil with a styrene-allyl alcohol copolymer as described in British Pat. No. 933,175; oil modified polyamide resin, alkyd resin and acrylic resin as proposed in British Pat. No. 972,169; a product obtained by reacting maleic anhydride with linseed oil, a product obtained by reacting epoxy resin with fatty acid of tall oil and a modified resin prepared by adding styrene to the reaction product of maleic anhydride and linseed oil mentioned above as described in British Pat. No. 1,016,957.

However, when using these resins of the prior arts for electrophoretic deposition in the form of an aqueous solution or emulsion, the qualities of the coating films obtained therefrom are accompanied by inherent drawbacks, respectively.

For example, many of the alkyd resins generally have a drawback in their very poor resistances to alkali. In addition, oftentimes, their resistances to corrosion, surface conditions and throwing powers of the resultant coating film are unsatisfactory.

SUMMARY OF THE INVENTION

It is, therefore, an object of this invention to provide a novel resinous coating composition for electrophoretic deposition completely different from those compositions known heretofore, eliminating drawbacks found in those compositions of the prior arts, and a process for producing such a novel composition.

In accordance with one aspect of this invention, there are provided a novel resinous coating composition for electrophoretic deposition in the form of an aqueous solution or emulsion essentially comprising a product obtained by neutralizing an adduct having an acid value of 50–250 of a polybutadiene having a molecular weight of 500–2,000 and containing 50–90% 1,2-linkage, 10–50% 1,4-linkage and an unsaturated dicarboxylic anhydride with a basic compound, and a process for producing such a novel coating composition.

The composition of this invention may be obtained by polymerizing butadiene in a solvent which preferably contains an alkyl aryl compound in the presence of a metallic sodium as a catalyst at a temperature of 50–150° C. to produce a polybutadiene having a molecular weight of 500–2,000 and containing 50–90% 1,2-linkage, 10–50% 1,4-linkage reacting the resulting polybutadiene with an unsaturated dicarboxylic anhydride to give an adduct having an acid value of 50–250 of said polybutadiene and said unsaturated dicarboxylic anhydride, neutralizing the resulting adduct with a basic compound, and dissolving the resulting product in water to give an aqueous solution thereof, or dispersing the resulting product line water to form an emulsion.

In the process of this invention, first butadiene is polymerized using a metallic sodium as a catalyst at a temperature ranging 50–150° C. in a hydrocarbon solvent, preferably containing an alkyl aryl compound such as toluene, xylene, ethylbenzene and cumene.

In the process of this invention, the metallic sodium may be used as a catalyst either in the form of a granule or a dispersion in a solvent. In the latter case, an inert hydrocarbon compound such as benzene, toluene or xylene may be used as a dispersing medium, and the same solvent as used in the polymerization of butadiene may be used for this purpose.

The amount of the metallic sodium used in the process of this invention is preferably from 0.1–20 mol percent based on butadiene used.

In polymerizing butadiene, various ethers such as dimethyl ether, diethyl ether, diisopropyl ether, dimethoxy ethane, diethoxy ethane, dioxane, tetrahydrofuran or anisol may be added, chiefly for the purpose of preventing undesirable coloration of the resulting polymer and partly for controlling the molecular weight of the resulting polymer.

By the addition of these ethers exemplified above, there may be obtained a polymer having the required molecular weight effectively and with a a good reproducibility.

However, of these ethers referred to above, the use of tetrahydrofuran and anisol is not suitable for the prevention of coloration, since they render the resulting polymer a drastic coloration.

The amount of these ethers used in the process of this invention ranges from 1 to 200 mol percent based on the metallic sodium used as a catalyst.

In polymerizing butadiene, the polymerization reaction is proceeded only rather mildly at temperatures lower than 50° C. so that a reaction temperature higher than 50° C. is preferable in carrying out the reaction on a commercial scale. However, the reaction temperature exceeding 150° C. leads to drastic association of the metallic sodium causing degradation in the polymerization activity and, in the case of an extremity, the polymerization is inhibited. Thus, a reaction temperature of from 50 to 150° C. is particularly preferable.

The polybutadiene obtained according to the polymerization reaction referred to above is a non-polar compound having unsaturated bonds in hydrocarbon skeleton and a molecular weight ranging 500–2,000 and containing 50–90% 1,2-linkage and 10–50% 1,4-linkage.

In the polymerization reaction mentioned above, it is preferable to use as a polymerization solvent an alkyl aryl compound such as toluene, xylene, ethylbenzene and cumene, alone; or a hydrocarbon solvent containing these alkyl aryl compounds as a component thereof, e.g. benzene-toluene or benzene-xylene mixed solvent. The reason is that the use of these alkyl aryl compounds facilitate controlling of the molecular weight of the resulting polybutadiene within the required range.

In a solvent containing no alkyl aryl compound mentioned above, it is difficult to control the molecular weight within the range specified above, because these alkyl aryl compounds serve as a chain transferring agent in the polymerization of butadiene.

Although the addition of unsaturated dicarboxylic anhydride described hereinafter may be accomplished easier in a low molecular weight polybutadiene having a molecular weight of less than 500, a depositing bath prepared therefrom only affords a coating film of unsatisfactory performance with regard to the physical properties, which are particularly poor, corrosion resistance and alkali resistance.

In a relatively high molecular weight polybutadiene having a molecular weight higher than 2,000 there takes place an increase in viscosity of the reaction product or, in the case of an extremity, the gelation of the reaction system in the course of addition reaction of unsaturated dicarboxylic anhydride so that it is difficult to obtain an adduct of unsaturated dicarboxylic anhydride usable in this invention.

In producing the resinous coating composition for electrophoretic deposition of this invention, it is necessary to introduce polar group into polybutadiene obtained according to the process mentioned above. There have been known heretofore processes for introducing a polar functionality into a non-polar compound having unsaturated bonds in hydrocarbon skeleton, such as epoxidation, halogenation, addition of unsaturated dicarboxylic anhydride, oxidation, hydroxylation formylation and carboxylation.

Among these processes for introducing the polar functionality, the addition of unsaturated dicarboxylic anhydride is utilized in the process of this invention, since the process ultimately affords an excellent coating film and it can be practised easily and economically.

That is, in the process of this invention, polybutadiene referred to above is allowed to react with unsaturated dicarboxylic anhydride to form an adduct of polybutadiene and unsaturated dicarboxylic anhydride, which is then neutralized with a basic compound, and the resulting product is dissolved in water to form an aqueous solution, or, dispersed in water to form an emulsion.

For brevity's sake, the adduct of polybutadiene and unsaturated dicarboxylic anhydride mentioned above may be referred to as "anhydride adduct" hereinafter.

Unsaturated dicarboxylic anhydrides which may be used in this invention include aliphatic dicarboxylic anhydrides such as maleic anhydride, citraconic anhydride and chloromaleic anhydride, and halogen-substituted derivatives thereof.

These unsaturated dicarboxylic anhydrides and halogen-substituted derivatives exemplified above may be used either alone or in admixture of two or more kinds.

The anhydride adducts mentioned above may be obtained, for example, by reacting 100 g. of polybutadiene mentioned above and 10–80 g. of anhydride mentioned above in the absence or presence of an inert hydrocarbon solvent such as benzene, toluene or xylene, using none or 0.01–5% by weight of various peroxides such as benzoyl peroxide and dicumyl peroxide as a catalyst at a temperature ranging 120–250° C. for 1–8 hours.

The amount of anhydride added may be easily known by determining an acid value of the resulting anhydride adduct according to JIS K5400.

The determination of an acid value set forth in JIS K5400 is as follows:

Into 100 ml. of a mixed solvent of benzene and ethanol in a ratio of 1:1 is dissolved 1 g. of sample and the resulting solution is titrated with a 0.1 N ethanolic KOH using phenolphthalene as an indicator. Then, the acid value is calculated by the following equation:

$$\text{Acid value (KOH mg./g.)} = \frac{5.6 \times 0.1 \text{ N} - \text{KOH (ml.)}}{\text{sample (g.)}}$$

In this invention, the acid value of anhydride adduct preferably ranges 50–250 (KOH mg./g.). The reason is that a depositing bath prepared from an anydride adduct having an acid value of less than 50, when used for the electrophoretic deposition, only affords a coating film having very poor and coarse surface far from satisfactory practical use, while an anhydride adduct having an acid value of higher than 250 is difficultly prepared due to extraordinary increase is viscosity of the reaction mixture, which often leads to the gelation, and gives a reaction product insoluble in ordinary organic solvents or in water, which is scarcely usable for practical purposes.

In this invention, half esters of said anhydride adduct of polybutadiene which can be easily obtained by reacting said anyhdride adduct with an alcohol may also be used provided that the half esters have an acid value ranging 50–250 as set forth herein.

Basic compounds which may be added to anhydride adduct in this invention include ammonia and primary, secondary and tertiary organic amine compounds such as methylamine, ethylamine, ethylmethylamine, diethylamine, triethylamine, tert-butylamine, monoethanol amine, diethanol amine and triethanol amine.

The amount of these basic compounds used ranges 0.1–3 mols, preferably 0.5–2 mols, per mol of anhydride group contained in anhydride adduct of polybutadiene mentioned above.

A base resin for the electrophoretic deposition in the form of an aqueous solution or emulsion obtained according to this invention by adding an unsaturated dicarboxylic anhydride to a polybutadiene having a molecular weight of 500–2,000 and containing 50–90% 1,2-linkage, 10–50% 1,4-linkage to produce an adduct having an acid value ranging 50–250 (KOH mg./g.) of polybutadiene and unsaturated dicarboxylic anhydride, and adding basic compound and water to the resulting adduct, may be used for the electrophoretic deposition in the form of a varnish or an enamel.

The coating film obtained by electrophoretically depositing the above-mentioned varnish or enamel and baking the same thereafter affords quite excellent properties with regards to the corrosion resistance, wet resistance, alkali resistance, adherence property, solvent resistance, electric insulating property, etc., which have never been found in coating films known heretofore.

However, the hardness of the electrophoretically deposited coating film obtained from a coating composition containing the anhydride adduct of polybutadiene mentioned above alone as a resinous component tends to be remarkably higher as compared with those of coating films obtained by the use of alkyd resins known heretofore.

Although the high hardness of the coating film is advantageous from an aspect of chemical performance such as corrosion resistance and wet resistance, when the composition is used as a primer by adding pigments such as titanium white, red iron oxide, carbon black or the like, the high hardness of the coating film which usually exceeds 2H in terms of a pencil hardness tends to distinguishably show scratches of sand-papering which often lead to unsatisfactory surface appearance when an overcoating is applied thereon. In addition, there have been left much to be desired with regard to physical properties such as flexibility, impact resistance and bending resistance.

The present inventors have conducted an extensive study in an attempt to eliminate these drawbacks described above and, as a result, have found that the under-coating film in the electrophoretic deposition may be softened to such an extent that the scratches of sand-papering are not so distinguishable thereby greatly improving the appearance of finished surface by incorporating unsaturated polyesters containing intermittently recurring ester bonds in their main polymeric chains into the anhydride adduct of polybutadiene mentioned above.

Moreover, it has been found that by so doing the physical properties of the coating film such as flexibility, impact resistance and bending resistance, may be remarkably improved without being accompanied by any important deterioration in the corrosion resistance, wet resistance, alkali resistance and solvent resistance which are desirable and inherent features of electrophoretically deposited coating film obtained by the use of the anhydride adduct of polybutadiene mentioned above.

Thus, in accordance with another aspect of this invention, there is provided a novel resinous coating composition for electrophoretic deposition in the form of an aqueous solution or emulsion neutralized with amines comprising (1) 10-95 parts by weight of an adduct having an acid value ranging 50-250 of a polybutadiene having a molecular weight ranging 500-2,000 and containing 50-90% 1,2-linkage, 10-50% 1,4-linkage obtained as described above and an unsaturated dicarboxylic anhydride, and (2) 5-90 parts by weight of an unsaturated polyester containing intermittently recurring ester bonds in their main polymeric chains and having an acid value of 30-300.

The unsaturated polyesters which may be used in this invention include those having at least one unsaturated bond and at least two ester bonds, and preferably having an acid value of 30-300.

If the acid value of the unsaturated ester is less than 30, the solubility of the resulting coating composition is unsatisfactory so that a good electrophoretically deposited coating film may not be obtained, while the acid value exceeding 300 would give an electrophoretically deposited coating film having unsatisfactory wet resistance and corrosion resistance, which is unsuitable for practical use.

In this invention, it is essential that the unsaturated polyester has at least one unsaturated bond. The unsaturated bonds contained in the unsaturated polyester serve to form a coating film having excellent physical properties by cross-linking within itself or co-cross-linking with unsaturated bonds contained in the anhydride adduct of polybutadiene at the time of baking the electrophoretically deposited coating film.

In addition, it is also essential that the unsaturated polyester used in this invention has at least two ester bonds. Since, in general, the ester bond renders bendability, it is presumed that the physical properties of the electrophoretically deposited coating film such as the flexibility, bending resistance and impact resistance are improved without deteriorating the excellent performance of the coating film obtained from the anhydride adduct of polybutadiene by the incorporation of these unsaturated polyesters into the anhydride adduct of polybutadiene mentioned above.

Examples of these unsaturated polyesters which may be used in this invention include adducts of natural drying oil or semi-drying oil and unsaturated dicarboxylic anhydride (when maleic acid is used as an unsaturated dicarboxylic anhydride, the resulting adduct may be referred to as "maleic oil" herein and a specific reference will be made to this "maleic oil" as a typical example of these adducts in the following description); alkyd resins modified with drying or semi-drying oil; and maleic oil referred to above or alkyd resins further modified with vinyl compounds such as styrene or vinyltoluene.

These maleic oil, alkyd resins and vinyl-modified compounds derived therefrom may be prepared according to the conventional methods known heretofore.

Typical examples of natural drying-oils, semi-drying oils and unsaturated fatty acids thereof suitable for use in this invention include linseed oil, dehydrated castor oil, tung oil, safflower oil, soybean oil, linseed oil fatty acid, soybean oil fatty acid, tall oil fatty acid and dehydrated castor oil fatty acid.

In producing maleic oil and alkyd resins mentioned above, these drying oil or semi-drying oil and unsaturated fatty acids thereof may be used either alone or in admixture of two or more kinds. Furthermore, they may also be used in admixture with non-drying oils such as coconut oil, or fatty acids thereof, or, alternatively, with natural rosins.

The examples of unsaturated dicarboxylic anhydrides which may be added to these natural oils or unsaturated fatty acids in the production of maleic oil mentioned above include aliphatic dicarboxylic anhydrides such as maleic anhydride, citraconic anhydride and chloromaleic anhydride, and halogen-substituted derivatives thereof. These unsaturated dicarboxylic anhydrides and halogen-substituted derivatives thereof may be used either alone or in admixture of two or more kinds.

The amount of unsaturated dicarboxylic anhydride used generally ranges 5-40 parts by weight per part by weight of natural oil or fatty acid mentioned above used.

Examples of acid components which may be used for producing alkyd resins mentioned above include polybasic acids and anhydrides thereof such as phthalic anhydride, isophthalic acid, terephthalic acid, tetrahydrophthalic acid, hexahydrophthalic acid, fumaric acid, trimellitic anhydride, maleic anhydride, adipic acid and sebacic acid.

Examples of polyhydroxyl compounds which may be used in this invention include ethylene glycol, propylene glycol, glycerol, pentaerythritol, trimethylol propane, trimethylol ethane, neopentyl glycol and mixxtures thereof.

The amounts of these respective components used are preferably 40-90 parts by weight of natural oils or fatty acids, 5-40 parts by weight of polybasic acids and 2-55 parts by weight of polyhydroxyl compounds.

As described above, the unsaturated polyesters used in this invention may be synthetized using these components mentioned above according to conventionally-known transesterification, esterification and addition reactions.

Alkyd resins are normally used by mixing an amount of melamic resins, phenolic resins or epoxide resins therewith. Similarly, in this invention, the unsaturated polyesters may be used together with an amount of these resins mentioned above.

The mixing proportion of the anhydride adduct of polybutadiene mentioned above to the unsaturated polyester referred to above may be varied in a considerably wide range. However, the use of excessively small amount of unsaturated polyester results in no remarkable improvement in the surface conditions of the electrophoretically deposited coating film nor enhancement in the physical properties of the resulting coating film, while the use of excessively large amount of the same leads to deterioration in the alkali resistance of the resulting coating film, presumably due to saponification of ester bond. Thus, the use of less than 90 parts by weight of unsaturated polyester based on 10-95 parts by weight of the anhydride adduct of polybutadiene is preferable for a satisfactory result.

In this invention, the anhydride adduct of polybutadiene obtained by using a metallic sodium as a catalyst mentioned above and the unsaturated polyester referred to above are neutralized with amine compounds either separately or simultaneously.

Examples of amine compounds preferably used for this purpose include ammonia and primary, secondary and tertiary organic amine compounds such as methylamine, ethylamine, ethylmethylamine, diethylamine, triethylamine, tertbutylamine, monoethanol amine, diethanol amine and triethanol amine.

The amount of these amine compounds used is preferably 0.1–3 mols per mol of anhydride group in the resin, and, particularly, the use of 0.5–2 mols on the same basis as above affords an excellent electrophoretically deposited coating film.

The coating composition of this invention consisting of neutralized anhydride adduct of polybutadiene and unsaturated polyester may be used for electrophoretic deposition in the form of an aqueous solution or emulsion.

The use of the resinous coating composition in the form of an aqueous solution or emulsion obtained according to this invention as such, as varnish, or as an enamel with the addition of pigments thereto affords an excellent coating film in the electrophoretic deposition in which an electroconductive substrate to be coated being immersed in a bath of said varnish or said enamel and a direct electric current being passed therethrough to form a coating film on the surface of said electroconductive substrate.

In carrying out the electrophoretic deposition using the resinous coating composition of this invention, the concentration of solid component in the electrophoretic deposition bath ranges 5–40%, the depositing voltage is from 10 to 150 v. and the bath temperature is from 20 to 50° C.

The depositing period preferably ranges 1–5 minutes and there may be obtained a coating film having a thickness of 1–100µ under these conditions.

The baking conditions under which the resulting coated article is baked preferably include a baking temperature of from 130 to 250° C. and a baking period of from 5 to 60 minutes.

The pigments which may be incorporated into the coating composition of this invention are those having less water-soluble components and good stabilities free from swelling by water, which are generally used for water-soluble paints. For example, titanium white including both rutile and anatase types, lithopone, calcium carbonate, barium sulfate, mica, clay, red iron oxide, phthalocyanine blue, phthalocyanine green, Prussian blue, chrome yellow, molybdenum orange, strontium chromate, carbon black, tinting red, Hansa yellow and mixtures thereof.

These pigments exemplified above may be kneaded into the resinous composition by conventional methods using a sand-mill or a roll mill.

The amount of pigments used preferably ranges 0.1–40 parts by weight based on 30 parts by weight of the resinous component.

In the process of this invention, water is primarily used as a medium in a cell in which the electrophoretic deposition is effected, and there may be employed some organic solvents together with water for the purposes of controlling viscosity of the depositing bath as well as improving the workability.

Examples of organic solvents which may be used for the purposes mentioned above include alcohols such as methanol, ethanol, isopropyl alcohol, n-butanol, sec-butanol and tert-butanol; ether alcohols such as ethyl Cellosolve, n-propyl Cellosolve and n-butyl Cellosolve; and ketone alcohols such as diacetone alcohol. These organic solvents may be used in an amount of 0–50 parts by weight per 100 parts by weight of resin, depending upon needs.

The coating film obtained according to the process of this invention has excellent properties with regard to the luster, adhesiveness, wet resistance, corrosion resistance, alkali resistance, acid resistance and electric insulating property, so that it has great utilities in diversified fields of manufacturing such as various electric equipment and apparatus, machine tools and parts, automobile, constructural materials, home appliances, shipbuilding and so forth.

In accordance with this invention, there is provided a process for producing such a useful resinous coating composition for electrophoretic deposition which may be practised easily and economically on a commercial scale.

The production of coating film from the coating composition of this invention will be explained in detail in the preferred embodiments of this invention described hereinafter.

For example, one embodiment thereof may be briefly stated as follows:

There are mixed 2 parts by weight of the anhydride adduct referred to hereinbefore having an acid value of 100, 8 parts by weight of water and 0.4 part by weight of triethylamine. The resulting mixture is kept in a depositing cell in which the electric potential difference between an anode and a cathode is made 150 v. in the course of 20 seconds and maintained thereat for 40 seconds. There is obtained a coating film having a thickness of about 20µ on the substrate. The coated substrate is withdrawn from the cell and is washed in a cleaning cell followed by baking in a baking furnace at 180° C. for 10 minutes.

DESCRIPTION OF THE PREFERRED EMBODIMENTS

The following examples will serve to illustrate this invention more practically. It should not be construed however, that these examples restrict this invention in any way.

EXAMPLE 1

To a 35 l. capacity stainless steel autoclave provided with an agitator which was flushed with nitrogen, were charged 8.1 kg. of 1,3-butadiene, 13 l. of toluene, 70 g. of dioxane and 200 g. of metallic sodium which was pulverized to particle sizes ranging 10–50µ and dispersed, and the reaction was carried out at 80° C. for 2 hours. After the catalyst was decomposed by water at the end of the period, the reaction mixture was neutralized with hydrochloric acid, then, after sodium chloride formed was removed from the reaction mixture by washing with water, toluene was distilled off under a reduced pressure and the polymerization product was further distilled under a reduced pressure to afford a polymer (I) having a boiling point of 172–182° C./1 mm. Hg in a yield of 8% based on butadiene and a polymer (II) which was a polymerization residue in a yield of 80% based on butadiene.

The properties of the polymers (I) and (II) thus obtained were as follows:

|  | Polymer (I) | Polymer (II) |
| --- | --- | --- |
| Number average molecular weight | 360 | 740 |
| Trans-double bond, percent | 24.2 | 17.3 |
| Vinyl-double bond, percent | 28.3 | 61.3 |
| Cis-double bond | Trace | Trace |
| Viscosity (poises, 25° C.) | 0.3 | 3.8 |

The number average molecular weights referred to above were measured by a vapor-pressure osmometer (Mecrolab Model 301A). The double bonds were calculated by Morero's absorbance based on measuring of infrared absorption spectra. The viscosities were measured by a rotation viscometer.

The addition reaction of maleic anhydride to the butadiene polymer (II) thus obtained was carried out as follows:

To a one-liter capacity autoclave were charged 300 g. of the butadiene polymer (II) referred to above, 300 g.

of benzene and 60 g. of maleic anhydride and the reaction was carried out at 210° C. for 3 hours. After the completion of the reaction, benzene and unreacted maleic anhydride were distilled off under a reduced pressure and there was obtained an adduct of polybutadiene and maleic anhydride. This adduct may be referred to as "maleic adduct" hereinafter.

The properties of the maleic adduct thus obtained were as follows:

| | |
|---|---|
| Number average molecular weight | 832 |
| Trans-double bond (percent) | 15.5 |
| Vinyl-double bond (percent) | 53.2 |
| Cis-double bond | Trace |
| Viscosity (poises, 25° C.) | 15,000 |
| Acid value (KOH mg./g.) | 87 |

Into 10 g. of n-butyl Cellosolve were dissolved 50 g. of maleic adduct obtained above and there were added 6.8 g. of triethylamine. To the resulting mixture were added 450 g. of water with vigorous agitation to form an aqueous solution.

The electrophoretic deposition was conducted by using the aqueous solution as a depositing bath, a panel treated with zinc phosphate as an anode plate and a steel plate of the same size as a cathode plate at 25° C. for 3 minutes while varying the voltage within the range of 50–150 v.

The resulting coated substrate was baked at 170° C. for 30 minutes. The performance of the baked coating film thus obtained are shown in Table 1.

As is clear from the Table 1, the coating film thus obtained shows excellent performance in all respects and comparison with the performance of a coating film obtained from a linseed oil-modified alkyd resin which is commercially available as a resinous coating composition for electrophoretic deposition reveals that the coating film of this invention has particularly superior corrosion resistance, alkali resistance and acid resistance over conventional coating films known heretofore.

TABLE 1.—PERFORMANCE TEST ON COATING FILM ELECTROPHORETICALLY DEPOSITED AND BAKED [1]

| Performance | Voltage used— | | |
|---|---|---|---|
| | 50 v. | 100 v. | 150 v. |
| Surface conditions of coating film. | Good | Good | Good. |
| Pencil hardness | 2H | 2H | 2H. |
| Sketching | 10 points | 10 points | 10 points. |
| Cross-hatching test (adhesive tape test). | 100/100 | 100/100 | 100/100. |
| Erichsen value | 6.0 | 5.5 | 5.5. |
| Impact strength | 500 g./40 cm. | 500 g./40 cm. | 500 g./30 cm. |
| Corrosion resistance: | | | |
| 85 hrs | 0.5 mm | 1 mm | 1 mm. |
| 205 hrs | 1.0 mm | 1 mm | 1.5 mm. |
| Wet resistance: | | | |
| 125 hrs | Unchanged | Unchanged | Unchanged. |
| 245 hrs | do | do | Do. |
| Alkali resistance 5% (NaOH). | Unchanged for 5 hrs. | Unchanged for 5 hrs. | Unchanged for 5 hrs. |
| Acid resistance 5% ($H_2SO_4$). | Unchanged for 24 hrs. | Unchanged for 24 hrs. | Unchanged for 24 hrs. |

[1] The methods of test were mostly relied on JIS K5400.

Comparative Example 1

To a one-liter capacity autoclave were charged 300 g. of the butadiene polymer (II) obtained in Example 1, 20 g. of maleic anhydride and 300 g. of benzene and the reaction was carried out at 220° C. for 3 hours to obtain a maleic adduct. The properties of the product were as follows:

| | |
|---|---|
| Number average molecular weight | 782 |
| Trans-double bond (percent) | 16.9 |
| Vinyl-double bond (percent) | 57.3 |
| Cis-double bond | Trace |
| Viscosity (poises, 25° C.) | 320 |
| Acid value (KOH mg./g.) | 31 |

Into 10 g. of n-butyl Cellosolve was dissolved 50 g. of the maleic adduct obtained above and there were added 2.8 g. of triethylamine and further 460 g. of water with vigorous agitation to prepare an electrophoretic deposition bath.

Into the bath thus prepared were immersed a panel treated with zinc phosphate and a steel plate and the electrophoretic deposition was carried out at 22° C. for 3 minutes with the voltage ranging 50–150 v. in the same manner as described in Example 1.

There was not obtained a good coating film due to very coarse surface thereof.

The experiment was repeated according to the same procedures as described above except that 50 g. of the maleic adduct, 15 g. of n-butyl Cellosolve, 2.5 g. of triethylamine and 460 g. of water were used, with a result that no satisfactory coating film was obtained.

Comparative Example 2

The synthesis of a maleic adduct was attempted by using 300 g. of the polybutadiene (II) described in Example 1, 180 g. of maleic anhydride and 300 g. of benzene at 220° C. for 3 hours. However, no maleic adduct usable for the electrophoretic deposition was obtained because of gelation of the reaction system after a lapse of 2 hours from the starting of the reaction.

Comparative Example 3

To a 500 ml. capacity autoclave were charged 300 g. of the polybutadiene (I) having a molecular weight of 360 obtained in Example 1 and 60 g. of maleic anhydride and the reaction was carried out at 220° C. for 3 hours in the absence of solvent. After the completion of the reaction, unreacted maleic anhydride was distilled off under a reduced pressure to yield a maleic adduct. The product maleic adduct had a number average molecular weight of 420, 20.6% trans-double bond, 23.1% vinyl-double bond, trace cis-double bond, a viscosity of above 20,000 poises at 25° C., and an acid value of 95 (KOH mg./g.).

To 50 g. of the maleic adduct obtained above were added 10 g. of n-butyl Cellosolve and 8.5 g. of triethylamine, and an aqueous solution thereof was formed by adding 450 g. of water thereto with vigorous agitation.

The electrophoretic deposition was carried out by using the aqueous solution obtained above as a depositing bath with a voltage of 100 v. at 25° C. for 3 minutes in the same manner as described in Example 1.

The resulting coated substrate was baked at 190° C. for 30 minutes. However, the physical properties of the coating film obtained was very poor and the corrosion resistance, alkali resistance and solvent resistance were unsatisfactory altogether.

EXAMPLE 2

Butadiene was polymerized according to the same procedures as described in Example 1 except that 180 g. of diethoxy ethane was substituted for dioxane. As a result, there was obtained a polymer having the following properties.

| | |
|---|---|
| Number average molecular weight | 1,950 |
| Trans-double bond (percent) | 16.1 |
| Vinyl-double bond (percent) | 70.0 |
| Cis-double bond | Trace |
| Viscosity (poises, 25° C.) | 65 |

To a 500 ml. capacity autoclave were charged 100 g. of the polybutadiene obtained above, 18 g. of maleic anhydride and 200 g. of xylene and the reaction was carried out at 200° C. for 3 hours to obtain a maleic adduct. The properties of the product maleic adduct were as follows:

| | |
|---|---|
| Number average molecular weight | 2,170 |
| Trans-double bond (percent) | 14.2 |
| Vinyl-double bond (percent) | 62.7 |
| Cis-double bond | Trace |
| Viscosity (poises, 25° C.) | Above 20,000 |
| Acid value (KOH mg./g.) | 72 |

Into 15 g. of n-butyl Cellosolve were dissolved 50 g. of the maleic adduct obtained above and there were added 60 g. of triethylamine and further 400 g. of water with vigorous agitation to form an aqueous solution.

The electrophoretic deposition was carried out by using the aqueous solution obtained above as a depositing bath with a voltage of 100 v. at 27° C. for 2 minutes in the same manner as described in Example 1.

The baking of the resulting coated substrate at 170° C. for 20 minutes afforded a coating film of good surface condition having satisfactory physical performances, corrosion resistance, wet resistance and alkali resistance.

EXAMPLE 3

To a 3-liter capacity stainless steel autoclave were charged 800 g. of butadiene, a mixed solvent consisting of 500 ml. of benzene and 500 ml. of toluene, 20 g. of metallic sodium and 7 g. of dioxane and the reaction was carried out at 80° C. for 2 hours to give a polybutadiene having the following properties in a yield of 87% based on butadiene used:

| | |
|---|---|
| Number average molecular weight | 980 |
| Trans-double bond (percent) | 19.7 |
| Vinyl-double bond (percent) | 67.3 |
| Cis-double bond | Trace |
| Viscosity (poises, 25° C.) | 14 |

To a 2-liter capacity autoclave were charged 500 g. of the polybutadiene obtained above, 100 g. of maleic anhydride and 500 g. of toluene and the reaction was carried out at 210° C. for 3 hours. After the completion of the reaction, toluene and unreacted maleic anhydride were distilled off under a reduced pressure to yield a maleic adduct having the following properties:

| | |
|---|---|
| Number average molecular weight | 1,090 |
| Trans-double bond (percent) | 17.5 |
| Vinyl-double bond (percent) | 60.8 |
| Cis-double bond (percent) | Trace |
| Viscosity (poises, 25° C.) | 18,000 |
| Acid value (KOH mg./g.) | 85 |

To 50 g. of the maleic adduct obtained above were added 10 g. of n-butyl Cellosolve and 7.0 g. of triethylamine and there were further added 400 g. of water with vigorous agitation to form an aqueous solution.

The electrophoretic deposition was carried out by using the aqueous solution obtained above as a depositing bath and a tin plate as an anode plate with a voltage of 100 v. at 24° C. for 2 minutes in the same manner as in Example 1.

The baking of the resulting coated substrate at 180° C. for 20 minutes afforded a coating film of good surface condition having satisfactory physical performances, corrosion resistance, wet resistance and alkali resistance.

Comparative Example 4

To a 3-liter capacity stainless steel autoclave provided with an agitator which was flushed with nitrogen were charged 800 g. of butadiene, 1000 cc. of benzene, 16 g. of dioxane and 15 g. of sodium and the reaction was carried out at 80° C. for 2 hours. By following the same procedures as described in Example 1 thereafter, there was obtained a polymer having properties as described in the following in a yield of 95%.

| | |
|---|---|
| Number average molecular weight | 3,130 |
| Trans-double bond (percent) | 11.5 |
| Vinyl-double bond (percent | 78.9 |
| Cis-double bond | Trace |
| Viscosity (poises, 25° C.) | 1,100 |

To a 500 ml. capacity autoclave were charged 100 g. of polybutadiene obtained above, 20 g. of maleic anhydride and 200 g. of benzene and the reaction was carried out at 220° C. for 2 hours. No maleic anhydride usable for electrophoretic deposition was obtained due to gelation of the reaction system.

EXAMPLE 4

To a 35-liter capacity stainless steel autoclave provided with an agitator which was flushed with nitrogen were charged 8.1 kg. of 1,3-butadiene, 16 liters of toluene, 152 g. of dioxane and 200 g. of metallic sodium and the reaction was carried out at 80° C. for 2 hours.

After the catalyst was destroyed by water at the end of the period, the reaction mixture was neutralized with hydrochloric acid, then, after NaCl formed was removed therefrom by washing with water, toluene was distilled off under a reduced pressure and there was obtained a polybutadiene (A) in a yield of 86% based on butadiene. The properties of the resulting polybutadiene (A) were as follows:

| | |
|---|---|
| Number average molecular weight | 820 |
| Trans-double bond (percent) | 17.5 |
| Vinyl-double bond (percent) | 61.4 |
| Cis-double bond | Trace |
| Viscosity (poises, 25° C.) | 6.7 |

The addition reaction of maleic anhydride to the polybutadiene thus obtained was effected as follows:

To a 6-liter capacity autoclave were charged 2 kg. of the polybutadiene (A), 2 kg. of xylene and 600 g. of maleic anhydride and the reaction was carried out at 200° C. for 5 hours.

At the end of the period, xylene and unreacted maleic anhydride were distilled off under a reduced pressure and there was obtained a maleic adduct (A) having the properties as follows:

| | |
|---|---|
| Number average molecular weight | 1,040 |
| Trans-double bond (percent) | 15.4 |
| Vinyl-double bond (percent) | 53.2 |
| Cis-double bond | Trace |
| Viscosity (poises, 25° C.) | 20,000 |
| Acid value (KOH mg./g.) | 105 |

Into 150 g. of n-butyl Cellosolve were dissolved 600 g. of the maleic adduct (A) and there were added 90.9 g. of triethylamine, then, after the mixture was vigorously agitated for 2 hours at room temperature, there were further added 5.4 liters of deionized water with vigorous stirring to prepare a depositing bath (I).

Subsequently, there were dissolved 1 kg. of dehydrated castor oil-modified alkyd resin (a) having an acid value of about 90 into 300 g. of n-butyl Cellosolve and to the resulting solution were added 141.5 g. of triethylamine, then, after the mixture was vigorously agitated for 3 hours at room temperature, 9 liters of deionized water were added thereto with vigorous agitation to prepare a depositing bath (II).

There were prepared the depositing baths (I)–(IX) by mixing the depositing baths (I) and (II) obtained above in various proportions. In the depositing baths thus prepared were immersed the panels treated with zinc phosphate and the electrophoretic depositions were carried out with a voltage ranging 80–150 v. for 2 minutes and the resulting coated substrates were baked at 170° C. for 30 minutes.

The test results on the performances of these coating films thus obtained are shown in Table 2.

As can be clearly noted from the Table 2, the coating films obtained according to this invention have excellent Erichsen values, impact strengths and bending resistances, and these properties are even superior particularly when the depositing bath contains 5–80 parts by weight of alkyd resin. Moreover, the table shows that the alkali resistances of the coating films obtained according to this invention are remarkably improved as compared with the cases where alkyd resin alone is used.

TABLE 2.—TEST RESULTS ON PERFORMANCES OF BAKED COATING FILM

| | Bath numbers | | | | | | | | |
|---|---|---|---|---|---|---|---|---|---|
| | I | III | IV | V | VI | VII | VIII | IX | II |
| Composition, parts by weight: | | | | | | | | | |
| Maleic adduct (A) | 100 | 95 | 90 | 80 | 60 | 50 | 30 | 20 | 0 |
| Alkyd resin (a) | 0 | 5 | 10 | 20 | 40 | 50 | 70 | 80 | 100 |
| Voltage (v.) | 150 | 130 | 120 | 110 | 100 | 100 | 90 | 90 | 80 |
| Thickness of coated film (μ) | 26 | 25 | 27 | 29 | 30 | 30 | 32 | 33 | 35 |
| Pencil hardness | 4H | 3H | 2H | H | F-H | F-H | F | HB-F | B-2B |
| Sketch | Good | Good | Good | Good | Good | Good | Good | Good | Good |
| Cross-hatching test (adhesive tape test) | 100/100 | 100/100 | 100/100 | 100/100 | 100/100 | 100/100 | 100/100 | 100/100 | 100/100 |
| Erichsen value (mm.) | 5.4 | 6.0 | 7.1 | 7.6 | 8.2 | 8.2 | 8.6 | >9 | >9 |
| Impact resistance (500 g./cm.): | | | | | | | | | |
| Surface | 30 | 40 | 50 | 50 | 50 | 50 | 50 | 50 | 50 |
| Back | 10 | 30 | 50 | 50 | 50 | 50 | 50 | 50 | 50 |
| Bending resistance (mm.) [1] | 8 | 6 | 4 | 4 | 2 | 2 | 2 | 2 | 2 |
| Corrosion resistance (mm.) [2] | 1.0 | 1.5 | 1.5 | 2.0 | 2.5 | 3.0 | 4.0 | 5.0 | 6.0 |
| Wet resistance | Good | Good | Good | Good | Good | Good | Good | Good | Good |
| Alkali resistance (hours) [3] | >2 | >2 | 1¾ | 1½ | 1¼ | 1⅙ | 1 | ½ | 1/12 |
| Acid resistance [4] | Good | Good | Good | Good | Good | Good | Good | Good | Good |
| Solvent resistance [5] | Good | Good | Good | Good | Good | Good | Good | Good | Good |

[1] Minimum radius of bending with no crack on film.
[2] Width of rust formed after spraying saline water for 120 hrs.
[3] Time lapsed when a change is observed after immersing the coated film in a 5% aqueous NaOH.
[4] Immersed in a 5% aqueous sulfuric acid for 24 hrs.
[5] Immersed in a mixture of toluol and xylol in a ratio of 1:1 for 48 hrs.

EXAMPLE 5

To a 2-liter autoclave were charged 700 g. of the polybutadiene (A) obtained in Example 4, 700 g. of toluene and 140 g. of maleic anhydride and the reaction was carried out at 200° C. for 7 hours, then, toluene and unreacted maleic anhydride were distilled off under a reduced pressure to yield a maleic adduct (A') having the following properties:

| | |
|---|---|
| Number average molecular weight | 990 |
| Trans-double bond (percent) | 15.5 |
| Vinyl-double bond (percent) | 53.7 |
| Cis-double bond | Trace |
| Viscosity (poises, 25° C.) | 20,000 |
| Acid value (KOH mg./g.) | 95 |

Into 100 g. of n-butyl Cellosolve was dissolved 500 g. of the maleic adduct (A') obtained above and there were added 60.0 g. of triethylamine and 8.3 g. of diethylamine, then, after the mixture was agitated for 3 hours at room temperature, 4.6 liters of deionized water were added thereto with vigorous agitation to prepare a deposition bath (X).

There were prepared the depositing baths (X)-(XVIII) by mixing the depositing bath (X) obtained above and the depositioning bath (II) obtained in Example 4 in various proportions.

In the depositing baths thus prepared were immersed the panels treated with zinc phosphate and the electrophoretic depositions were carried out with a voltage ranging 80–150 v. at 25° C. for 2 minutes in the same manner as in Example 4 and the resulting coated substrates were baked at 170° C. for 30 minutes.

The test results on the performances of these coating films thus obtained are tabulated in the following Table 3.

As can be clearly noted from the Table 3, the coating films obtained according to this invention have excellent Erichsen values, impact strengths and bending resistances, and these properties are even superior particularly when the depositing bath contains 5–90 parts by weight of alkyd resin. Moreover, the table shows that the alkali resistances of the coating films obtained according to this invention are clearly improved as compared with the cases where alkyd resin alone is used.

EXAMPLE 6

Into 60 g. of n-butyl Cellosolve were dissolved 200 g. of the maleic adduct (A) obtained in Example 4, then, there were added 30.3 g. of triethylamine and, after the resulting mixture was agitated for 2 hours at room temperature, 43 g. of deionized water were added thereto followed by agitation for another 3 hours at room temperature to prepare a clear varnish containing 60% resin solid component.

Into the resulting clear varnish were kneaded 110 g. of titanium white and 5 g. of carbon black by using a three-roll mill to obtain an enamel (A).

Likewise, into 60 g. of n-butyl Cellosolve were dissolved 200 g. of the dehydrated castor oil-modified alkyd resin (a) used in Example 4, then, there were added 28.3 g. of triethylamine and, after the resulting mixture was agitated for 3 hours at room temperature, 45 g. of deionized water were added thereto to obtain a clear varnish containing 60% resin solid component. Into the resulting varnish were kneaded 110 g. of titanium white and 5 g. of carbon black to prepare an enamel (a).

These enamels (A) and (a) thus prepared were mixed together in various proportion so that the total weight makes 100 g. and there were added 500 g. of deionized water to prepare the depositing baths (XVIII)-(XXIII).

TABLE 3.—TEST RESULTS ON PERFORMANCES OF BAKED COATING FILM

| | Bath numbers | | | | | | | | |
|---|---|---|---|---|---|---|---|---|---|
| | X | XI | XII | XIII | XIV | XV | XVI | XVII | II |
| Composition parts, by weight: | | | | | | | | | |
| Maleic adduct (A') | 100 | 95 | 90 | 80 | 60 | 40 | 20 | 10 | 0 |
| Alkyd resin (a) | 0 | 5 | 10 | 20 | 40 | 60 | 80 | 90 | 100 |
| Voltage (v.) | 150 | 140 | 120 | 120 | 100 | 100 | 90 | 80 | 80 |
| Thickness of film (μ) | 25 | 25 | 27 | 28 | 30 | 30 | 31 | 31 | 34 |
| Pencil hardness | 4H | 3H | 2H | H | F-H | F | HB | B-HB | B |
| Sketch | Good | Good | Good | Good | Good | Good | Good | Good | Good |
| Cross-hatching test (adhesive tape test) | 100/100 | 100/100 | 100/100 | 100/100 | 100/100 | 100/100 | 100/100 | 100/100 | 100/100 |
| Erichsen value (mm.) | 5.1 | 6.1 | 7.0 | 7.5 | 8.2 | 8.5 | 8.8 | >9 | >9 |
| Impact resistance (500 g./cm.): | | | | | | | | | |
| Surface | 30 | 40 | 50 | 50 | 50 | 50 | 50 | 50 | 50 |
| Back | 10 | 30 | 40 | 50 | 50 | 50 | 50 | 50 | 50 |
| Bending resistance (mm.) | 8 | 6 | 4 | 4 | 2 | 2 | 2 | 2 | 2 |
| Corrosion resistance (mm.) | 0.5 | 1.0 | 1.0 | 1.0 | 1.5 | 2.5 | 4.0 | 5.0 | 6.0 |
| Wet resistance | Good | Good | Good | Good | Good | Good | Good | Good | Good |
| Alkali resistance (hours) | >2 | >2 | 2 | 1¾ | 1½ | 1 | ¾ | ¼ | 1/15 |
| Acid resistance | Good | Good | Good | Good | Good | Good | Good | Good | Good |
| Solvent resistance | Good | Good | Good | Good | Good | Good | Good | Good | Good |

Note.—The measuring conditions and the basis of evaluation are the same as in Table 2.

Into these depositing baths thus prepared were immersed the panels treated with zinc phosphate and the electrophoretic depositions were carried out with a voltage ranging 70-160 v. for 2 minutes in the same manner as in Example 4 and the resulting coated substrates were baked at 160° C. for 30 minutes.

The test results on the performances of these coating films thus obtained are shown in the following Table 4.

The Table 4 clearly indicates that the coating films obtained according to this invention have excellent Erichsen values, impact strength and bending resistances as in preceding examples and, in addition, show improved finishing properties as well as superior alkali resistances.

sure to obtain a maleic adduct (B), the properties of which were as follows:

| | |
|---|---|
| Number average molecular weight | 800 |
| Trans-double bond (percent) | 15.6 |
| Vinyl-double bond (percent) | 54.0 |
| Cis-double bond | Trace |
| Viscosity (poises, 25° C.) | 15,000 |
| Acid value (KOH mg./g.) | 102 |

The maleic adduct (B) obtained above was mixed with a linseed oil-modified alkyd resin (b) having an acid value of about 80, in various proportions to make the total weight of 100 g.

TABLE 4.—TEST RESULTS ON PERFORMANCES OF BAKED COATING FILM

| | Bath numbers | | | | | |
|---|---|---|---|---|---|---|
| | XVIII | XIX | XX | XXI | XXII | XXIII |
| Composition, parts by weight: | | | | | | |
| Enamel (A) | 100 | 80 | 60 | 40 | 20 | 0 |
| Enamel (a) | 0 | 20 | 40 | 60 | 80 | 100 |
| Voltage (v.) | 160 | 140 | 120 | 100 | 80 | 70 |
| Thickness of film ($\mu$) | 31 | 33 | 34 | 34 | 36 | 35 |
| Pencil hardness | >4H | 2H | F-H | F-H | F | B-HB |
| Sketch | Good | Good | Good | Good | Good | Good |
| Cross-hatching test (adhesive tape test) | 100/100 | 100/100 | 100/100 | 100/100 | 100/100 | 100/100 |
| Erichsen value (mm.) | 5.5 | 7.8 | 8.2 | 8.6 | >9 | >9 |
| Impact resistance (500 g./cm.): | | | | | | |
| Surface | 30 | 50 | 50 | 50 | 50 | 50 |
| Back | 10 | 40 | 50 | 50 | 50 | 50 |
| Bending resistance (mm.) | 6 | 4 | 2 | 2 | 2 | 2 |
| Corrosion resistance (mm.) | 0.5-1 | 1-2 | 2.0 | 2.5 | 3.0 | 3.0 |
| Wet resistance | Good | Good | Good | Good | Good | Good |
| Alkali resistance (hours) | >8 | 5 | 3½ | 2 | 1-1.5 | ¼ |
| Acid resistance | Good | Good | Good | Good | Good | Good |
| Solvent resistance | Good | Good | Good | Good | Good | Good |
| Overcoating applicability [1] | (²) | (³) | Good | Good | Good | Good |

[1] Evaluated on the basis of undistinguishability of sand-papering trace on the coated surface.
[2] Trace distinguishable.
[3] Trace slightly distinguishable.

NOTE.—Other measuring conditions and the basis of evaluation are the same as in Table 2.

EXAMPLE 7

Example 4 was repeated according to the same procedures as described therein except that 15 liters of toluene, 15 g. of dioxane and 35 g. of metallic sodium were used, and there was obtained a polybutadiene (B) having the following properties:

| | |
|---|---|
| Number average molecular weight | 650 |
| Trans-double bond (percent) | 17.1 |
| Vinyl-double bond (percent) | 61.5 |
| Cis-double bond | Trace |
| Viscosity (poises, 25° C.) | 5.0 |

To a 3-liter capacity autoclave were charged 1 kg. of the polybutadiene (B) obtained above, 200 g. of maleic anhydride and 1 kg. of toluene and after the reaction was carried out at 200° C. for 8 hours, toluene and unreacted maleic anhydride was distilled off under a reduced pressure to obtain a maleic adduct (B), the properties of which were as follows:

The resulting mixtures were dissolved into 30 g. of n-butyl Cellosolve, respectively, and, after adding triethylamine as specified in the following table thereto, the mixture was agitated for 3 hours at 40° C., then, deionized water was added thereto with vigorous agitation to prepare the depositing baths (XXIV)-(XXIX).

Into these depositing baths thus prepared were immersed the panels treated with zinc phosphate and the electrophoretic depositions were carried out with a voltage ranging 80-140 v. for 2 minutes and the resulting coated films were baked at 160° C. for 30 minutes.

The test results on the performances of these coating films thus obtained are shown in the following Table 5.

As is clear from the Table 5, the coating films obtained according to this invention have excellent Erichsen values, impact resistances and bending resistances as in the preceding examples and, in addition, have superior chemical resistances such as alkali resistances.

TABLE 5.—TEST RESULTS ON PERFORMANCES OF BAKED COATING FILM

| | Bath numbers | | | | | |
|---|---|---|---|---|---|---|
| | XXIV | XXV | XXVI | XXVII | XXVIII | XXIX |
| Composition, parts by weight: | | | | | | |
| Maleic adduct (B) | 100 | 90 | 70 | 50 | 30 | 0 |
| Alkyd resin (b) | 0 | 10 | 30 | 50 | 70 | 100 |
| Triethylamine | 14.7 | 14.4 | 13.8 | 13.1 | 12.5 | 11.5 |
| Deionized water | 850 | 850 | 850 | 850 | 850 | 850 |
| Voltage (v.) | 140 | 140 | 120 | 110 | 90 | 80 |
| Thickness of film ($\mu$) | 27 | 26 | 30 | 32 | 34 | 36 |
| Pencil hardness | 4H | 2H-3H | H | F-H | B-HB | B-2B |
| Sketch | Good | Good | Good | Good | Good | Good |
| Cross-hatching test (adhesive tape test) | 100/100 | 100/100 | 100/100 | 100/100 | 100/100 | 100/100 |
| Erichsen value (mm.) | 5.0 | 7.1 | 7.8 | 8.2 | 8.5 | >9 |
| Impact resistance (500 g./cm.): | | | | | | |
| Surface | 30 | 40 | 50 | 50 | 50 | 50 |
| Back | 10 | 30 | 50 | 50 | 50 | 50 |
| Bending resistance (mm.) | 8 | 6 | 4 | 2 | 2 | 2 |
| Corrosion resistance (mm.) | 0.5-1.0 | 0.5-1.0 | 1.0 | 1.5 | 2.5 | 5.0 |
| Wet resistance | Good | Good | Good | Good | Good | Good |
| Alkali resistance (hours) | >2 | >2 | 1¾ | 1 | ½ | 1/12 |
| Acid resistance | Good | Good | Good | Good | Good | Good |
| Solvent resistance | Good | Good | Good | Good | Good | Good |

NOTE.—The measuring conditions and the basis of evaluation are the same as in Table 2.

EXAMPLE 8

Example 1 was repeated according to the same procedures as in Example 1 except that 57.5 g. of metallic sodium and 25 g. of dioxane were used and there was obtained a polybutadiene (C) in a yield of 93% based on butadiene. The properties of the resulting polybutadiene (C) were as follows:

| | |
|---|---|
| Number average molecular weight | 1,230 |
| Trans-double bond (percent) | 20.0 |
| Vinyl-double bond (percent) | 69.2 |
| Cis-double bond | Trace |
| Viscosity (poises, 25° C.) | 12.4 |

To a 6-liter autoclave were charged 2 kg. of the polybutadiene (C) obtained above, 400 g. of maleic anhydride and 2 kg. of toluene and the reaction was carried out at 190° C. for 6 hours, then, toluene and unreacted maleic anhydride were distilled off under a reduced pressure to yield a maleic adduct (c) having the following properties:

| | |
|---|---|
| Number average molecular weight | 1,400 |
| Trans-double bond (percent) | 17.6 |
| Vinyl-double bond (percent) | 63.7 |
| Cis-double bond | Trace |
| Viscosity (poises, 25° C.) | Above 20,000 |
| Acid value (KOH mg./g.) | 87 |

Into 150 g. of n-butyl Cellosolve were dissolved 500 g. of the maleic adduct (c) obtained above and there were added 47.1 g. of triethylamine and 7.6 g. of diethylamine and, after the resulting mixture was agitated for about 2 hours at room temperature, 4.5 liters of deionized water were added thereto with vigorous agitation to prepare a depositing bath (XXX).

On the other hand, into 150 g. of n-butyl Cellosolve were dissolved 500 g. of the alkyd resin (b) used in Example 7 and there were added 125.5 g. of triethylamine, then, after the resulting mixture was agitated for about 2 hours at room temperature, 4.5 liters of deionized water were added thereto to prepare a depositing bath (XXXI).

These depositing baths (XXX) and (XXXI) thus prepared were mixed together in various proportion to prepare the depositing baths (XXXII)–(XXXIV).

The electrophoretic depositions were carried out using these depositing baths thus obtained with a voltage ranging 80–150 v. for 2 minutes and the resulting coating films were baked at 160° C. for 30 minutes.

The test result on the performances of these coating films thus obtained are tabulated in the following Table 6.

As is clear from the Table 6, the coating films obtained according to this invention have excellent Erichsen values, impact resistances and bending resistances and, in addition, have good chemical resistances.

and there were added 14.5 g. of triethylamine, then, the resulting mixture was agitated for 2 hours at room temperature. To the mixture thus agitated were added 27.1 g. of deionized water to prepare a clear varnish (c) containing 60% resin solid component.

There were mixed 30 g. of the clear varnish (c) obtained above, 270 g. of the clear varnish containing 60% resin solid component prepared the maleic adduct used in Example 6, 81 g. of titanium white and 9 g. of carbon black and the mix was sufficiently kneaded in a three-roll mill, then, to thus kneaded mix were added 1,400 g. of deionized water with vigorous agitation to prepare a depositing bath (XXXV).

Into the depositing bath thus prepared were immersed the panels treated with zinc phosphate and the electrophoretic deposition was carried out with a voltage of 130 v. for 2 minutes and the resulting coated film was baked at 180° C. for 30 minutes.

The test results on performance of the coating film thus obtained are tabulated in Table 7 shown hereinafter which clearly shows that the physical properties such as flexibility, impact resistance and bending resistance, as well as the applicability of an over-coating, of the coating film are remarkably improved by the process of this invention.

EXAMPLE 10

Into 60 g. of n-butyl Cellosolve were dissolved 40 g. of a maleic oil (d) having an acid value of 80 prepared from 50 g. of linseed oil, 50 g. of dehydrated castor oil and 33 g. of maleic anhydride, and 160 g. of the maleic adduct (B) used in Example 7, and there was added 28 g. of triethylamine, then, after the resulting mixture was agitated for 2 hours at 40° C., 1,700 g. of deionized water were added thereto with vigorous agitation to prepare a depositing bath (XXXVI).

Into the depositing bath (XXXVI) thus prepared were immersed the panels treated with zinc phosphate and the electrophoretic deposition was carried out with a voltage of 100 v. for 2 minutes and the resulting coated film was baked at 170° C. for 30 minutes.

The test results on performance of the coating film thus obtained are tabulated in Table 7 shown hereinafter and it is appreciated that the physical properties such as flexibility, impact resistance and bending resistance of the coating film are remarkably improved by the process of this invention.

EXAMPLE 11

There were mixed 20 g. of alkyd resin (e) having an acid value of 80 prepared from 20 g. of trimellitic anhydride, 19 g. of propylene glycol, 5 g. of adipic acid and 25 g. of tall oil fatty acid, and 180 g. of the maleic

TABLE 6.—TEST RESULTS ON PERFORMANCES OF BAKED COATING FILM

| Composition, parts by weight: | Bath numbers | | | | |
|---|---|---|---|---|---|
| | XXX | XXXII | XXXIII | XXXIV | XXXI |
| Maleic adduct (c) | 100 | 75 | 50 | 25 | 0 |
| Alkyd resin (b) | 0 | 25 | 50 | 75 | 100 |
| Voltage (v.) | 150 | 120 | 100 | 90 | 80 |
| Thickness of film (μ) | 30 | 31 | 32 | 34 | 33 |
| Pencil hardness | 4H | H-2H | F-H | HB | B-2B |
| Sketch | Good | Good | Good | Good | Good |
| Cross-hatching test (adhesive tape test) | 100/100 | 100/100 | 100/100 | 100/100 | 100/100 |
| Erichsen value (mm.) | 5.9 | 7.9 | 8.5 | 8.7 | >9 |
| Impact resistance (500 g./cm.): | | | | | |
| Surface | 40 | 50 | 50 | 50 | 50 |
| Back | 20 | 40 | 50 | 50 | 50 |
| Bending resistance (mm.) | 8 | 4 | 2 | 2 | 2 |
| Corrosion resistance (mm.) | 0.5-1.0 | 1.5 | 2.0 | 3.0 | 5.0 |
| Wet resistance | Good | Good | Good | Good | Good |
| Alkali resistance (hours) | >2 | 1¾ | 1 | ⅓ | 1/12 |
| Acid resistance | Good | Good | Good | Good | Good |
| Solvent resistance | Good | Good | Good | Good | Good |

NOTE.—The measuring conditions and the basis of evaluation are the same as in Table 2.

EXAMPLE 9

Into 25 g. of n-butyl Cellosolve were dissolved 100 g. of a maleic oil (c) having an acid value of 90 prepared from 120 g. of linseed oil and 39.6 g. of maleic anhydride, adduct (B) used in Example 7, and to the resulting mixture were added first 50 g. of n-butyl Cellosolve and subsequently 29 g. of triethylamine, then, after the mixture was agitated for an hour at 50° C., 1,800 g. of deionized water were added thereto with vigorous agitation to prepare a depositing bath (XXXVII).

Into the depositing bath (XXXVII) thus prepared were immersed the panels treated with zinc phosphate and the electrophoretic deposition was carried out with a voltage of 90 v. for 2 minutes and the resulting coated film was baked at 180° C. for 20 minutes.

The test results on performance of the coating film thus obtained are tabulated in the following Table 7 and it can be clearly noted from the table that the physical properties such as flexibility, impact resistance and bending resistance of the coating film are greatly improved by the process of this invention.

TABLE 7.—TEST RESULTS ON PERFORMANCE OF BAKED COATING FILM

| | Example Nos. | | |
|---|---|---|---|
| | 9 | 10 | 11 |
| Bath Nos. | XXXV | XXXVI | XXXVII |
| Type and amount of maleic adduct (g.): | | | |
| (A) [1] | 162 | | |
| (B) | | 170 | 130 |
| Type and amount of unsaturated polyester (g.): | | | |
| Maleic oil (c) [2] | 18 | | |
| Maleic oil (d) | | 30 | |
| Alkyd resin (e) | | | 20 |
| Voltage (v.) | 130 | 100 | 90 |
| Thickness of film (μ) | 22 | 21 | 20 |
| Pencil hardness | H | F-H | H-2H |
| Erichsen value (mm.) | 8.0 | 8.5 | 8.1 |
| Impact resistance (500 g./cm.): | | | |
| Surface | 50 | 50 | 50 |
| Back | 40 | 50 | 40 |
| Bending resistance (mm.) | 4 | 2 | 2 |
| Corrosion resistance (mm.) | 0.5-1 | 1-2 | 1-2 |
| Alkali resistance (hours) | 4 | 2 | 4 |
| Acid resistance | Good | Good | Good |
| Solvent resistance | Good | Good | Good |
| Over-coating applicability | Good | | |

[1] 270 g. of a clear varnish containing 60% resin solid component was used.
[2] 30 g. of a clear varnish containing 60% resin solid component was used.

NOTE.—The measuring conditions and the basis of evaluation are the same as in Table 2.

We claim:
1. A resinous coating composition for electrophoretic deposition in the form of an aqueous solution or an aqueous emulsion essentially comprising an adduct of an unsaturated dicarboxylic anhydride and a polybutadiene having a molecular weight of 500–2,000 and containing 50–90% 1,2-linkage and 10–50% 1,4-linkage, said adduct having an acid value ranging 50–250, and said composition being neutralized with a basic compound.

2. The composition according to claim 1 wherein said unsaturated dicarboxylic anhydride is at least a member selected from the group consisting of maleic anhydride, citraconic anhydride and chloromaleic anhydride.

3. The composition according to claim 1 wherein said polybutadiene is obtained by polymerizing butadiene at a temperature of 50–150° C. in a solvent containing an alkyl aryl compound using a metallic sodium as a polymerization catalyst.

4. The composition according to claim 3 wherein said alkyl aryl compound is a member selected from the group consisting of toluene, xylene, ethylbenzene and cumene.

5. The composition according to claim 1 wherein said basic compound is a member selected from the group consisting of ammonia, methylamine, ethylamine, ethylmethylamine, diethylamine, triethylamine, tert-butylamine, monoethanol amine, diethanol amine and triethanol amine.

6. The composition according to claim 1 wherein said resinous coating composition further contains pigments.

7. A resinous coating composition for electrophoretic deposition in the form of an aqueous solution or an aqueous emulsion essentially comprising (A) 10–95 parts by weight of an adduct of an unsaturated dicarboxylic anhydride and a polybutadiene having a molecular weight of 500–2,000 and containing 50–90% 1,2-linkage and 10–50% 1,4-linkage, said adduct having an acid value ranging 50–250, and (B) 5–90 parts by weight of an unsaturated polyester containing intermittently recurring ester bonds in its main polymeric chain and having an acid value of 30–300, and said composition being neutralized with a basic compound.

8. The composition according to claim 7 wherein said unsaturated polyester is an alkyd resin having an acid value of 30–300.

9. The composition according to claim 7 wherein said unsaturated polyester is an adduct of a natural drying oil or a natural semi-drying oil, and an unsaturated dicarboxylic anhydride.

10. The composition according to claim 7 wherein said unsaturated dicarboxylic anhydride is at least a member selected from the group consisting of maleic anhydride, citraconic anhydride and chloromaleic anhydride.

11. The composition according to claim 7 wherein said polybutadiene is obtained by polymerizing butadiene at a temperature of 50–150° C. in a solvent containing an alkyl aryl compound using a metallic sodium as a polymerization catalyst.

12. The composition according to claim 1 wherein said alkyl aryl compound is a member selected from the group consisting of toluene, xylene, ethylbenzene and cumene.

13. The composition according to claim 7 wherein said basic compound is a member selected from the group consisting of ammonia, methylamine, ethylamine, ethylmethylamine, diethylamine, triethylamine, tert-butyl amine, monoethanol amine, diethanol amine and triethanol amine.

14. The composition according to claim 7 wherein said resinous coating composition further contains pigments.

References Cited

UNITED STATES PATENTS

| 3,055,855 | 9/1962 | Anderson et al. | 260—29.7 |
| 3,251,790 | 5/1966 | Christenson et al. | 260—18 |
| 3,414,432 | 12/1968 | Mertzweiller et al. | 260—29.7 |

FOREIGN PATENTS

| 972,169 | 10/1964 | Great Britain. |
| 1,016,957 | 1/1966 | Great Britain. |

DONALD E. CZAJA, Primary Examiner

R. W. GRIFFIN, Assistant Examiner

U.S. Cl. X.R.

117—132, 134, 161, 167; 204—181; 260—23.7, 29.7, 32.4, 32.6, 33.2, 33.4, 40, 41.5, 78.5, 861